US005726642A

United States Patent [19]

Kudoh et al.

[11] Patent Number: 5,726,642

[45] Date of Patent: Mar. 10, 1998

[54] SELECTIVE CALLING RADIO RECEIVER HAVING A NON-READ MESSAGE ALARM FUNCTION

[75] Inventors: Kazuhiro Kudoh; Makoto Shima, both of Tokyo; Jun Uchida, Shizuoka, all of Japan

[73] Assignee: NEC Corporation, Japan

[21] Appl. No.: 274,227

[22] Filed: Jul. 13, 1994

[30] Foreign Application Priority Data

Jul. 14, 1993 [JP] Japan .................................. 5-173527

[51] Int. Cl.$^6$ .................................................. H04Q 1/00

[52] U.S. Cl. ...................... 340/825.44; 379/57; 455/38.1

[58] Field of Search ........................ 340/825.44, 825.46; 379/57; 455/38.1

[56] References Cited

U.S. PATENT DOCUMENTS 4,704,608 11/1987 Sato .................................. 340/825.44

FOREIGN PATENT DOCUMENTS 2-43037 3/1990 Japan .

6-29906 2/1994 Japan ................................ 340/825.44

*Primary Examiner*—Brian Zimmerman

*Attorney, Agent, or Firm*—Ostrolenk, Faber, Gerb & Soffen LLP

[57] ABSTRACT

A selective calling radio receiver includes a message memory for distinguishably storing the message as non-read message and read message, and a control portion. The control portion performs a non-read alarm when the non-read message is stored in the message memory and a normal alarm when there is no non-read message stored therein. The control portion also has a function of performing a call alarm termination and display of message and storing the message in the message memory as a read message when a switch for requesting termination of the call alarm is pushed at a time of a call alarm and terminating the call alarm and storing the message in the message memory as a non-read message when the switch is not operate after a specific period of time.

16 Claims, 7 Drawing Sheets

SELECTIVE CALLING RADIO RECEIVER HAVING A NON-READ MESSAGE ALARM FUNCTION

BACKGROUND OF THE INVENTION

The present invention relates to a selective calling radio receiver and, particularly, to a selective calling radio receiver having a function of providing an alarm of the existence of a message which is received by the receiver but not displayed on a display portion thereof, that is, a non-read message.

In a conventional selective calling radio receiver of this kind, a bearer of the receiver whose ID number coincides with a calling signal is notified by any of a plurality of alarming means including alarming sound generated through a loudspeaker, vibration by means of a vibrator and LED, that he is being called.

When the bearer recognizes the alarming that he is being called, he stops the alarm by operating a switch, etc., of the receiver, depending upon the alarming means used.

When the alarming is stopped, the selective calling radio receiver displays a message following the calling signal on its display portion to notify the bearer of the contents of message.

However, when the bearer does not become aware of the call to him and, necessarily does not operate the switch to stop the alarm, the selective calling radio receiver stops the alarm after a certain period of time beginning with the start of the alarm.

That is, the selective calling radio receiver interprets non-operation of the switch by the bearer as that he did not become aware of the call to him and does not display the message on the display portion thereof but stores the message in its memory as a non-read message.

The non-read message stored in the memory may be confirmed by the bearer when the bearer operates means, such as switch, for confirming the non-read message.

However, it is necessary in order to confirm the non-read message to operate a switch, which is troublesome. Further, since a memory capacity of the memory is definite, old non-read message or messages stored in the memory may be erased, resulting in that the bearer can not confirm existence of non-read message or messages.

In order to solve these problems inherent to the conventional selective calling radio receiver, Japanese Utility Model Laid-open No. H2-43037, for example, proposes a selective calling radio receiver capable of alarming an existence of non-read message by means of sound generated at a predetermined time interval.

This technique solves the problems of troublesome confirmation procedure of non-read message and erasure of non-read message, indeed. In order to realize the technique, however, a timing circuit for measuring time is necessary, which makes an internal construction of the receiver complicated. Particularly, in view of recent tendency of miniaturization of the selective calling radio receiver, such complicated internal construction may become a fatal defect. Further, since, in this technique, the alarming of existence of non-read message is made every predetermined time interval in addition to that made when the selective calling radio receiver itself is called, a meeting may be disturbed by such frequent alarming if the bearer of the receiver is one of attendants of the meeting.

SUMMARY OF THE INVENTION

An object of the present invention is to provide a selective calling radio receiver having an alarm function of alarming non-read message to a bearer of the receiver to allow the bearer to confirm an existence of non-read message reliably.

Another object of the present invention is to perform an alarming when the selective calling radio receiver itself is called, in different manners according to whether or not non-read message exists in a memory of the receiver.

A further object of the present invention is to perform the alarming when the selective calling radio receiver itself is called, by a plurality of alarming means including sound from a loudspeaker, vibration of a vibrator and light from an LED, in each of which alarming is performed in different manner according to whether or not non-read message exist in a memory of the receiver.

Still another object of the present invention is to alarm by making at least one of alarming cycle period, alarming pattern and alarming frequency of each alarming means different according to whether or not non-read message exists.

The selective calling radio receiver having an alarm function of alarming non-read message, according to the present invention, comprises an antenna which is known, a radio portion for demodulating a received signal, an ID-ROM, a decoder, a switch for requesting a termination of alarming, display means for displaying a message and alarming means for alarming a calling. The selective calling radio receiver having an alarm function of alarming non-read message, according to the present invention, further comprises a message memory for storing a message contained in a digitized and demodulated signal from the decoder distinguishably as non-read message and read message. Further, the selective calling radio receiver having an alarm function of alarming non-read message, according to the present invention, comprises a control portion for controlling the receiver to perform a non-read alarming in a case where a non-read message exists in the message memory when an identification ("ID") coincidence signal output from the decoder is received and to perform a normal alarm when there is no non-read message. Further, this control portion has a function of controlling the receiver to terminate the non-read alarming or the normal alarming when there is a request of termination of alarming supplied by pushing the switch and to display the message on the display portion and store it in the message memory as a read message, and, to terminate the non-read alarming or the normal alarming when the switch is not pushed after a constant time lapses and store it in the message memory as a non-read message.

The control portion of the selective calling radio receiver having an alarm function of alarming non-read message, according to the present invention, constructed as mentioned above, can search whether or not non-read message exists in the message memory and change the call alarming manner according to presence or absence of non-read message.

The features and advantages of the invention to achieve these objects will become more fully apparent from the following detailed description taken in conjunction with the accompanying drawings.

DESCRIPTION OF THE PREFERRED EMBODIMENTS

The present invention will be described in detail with reference to the accompanying drawings.

Figure 1:
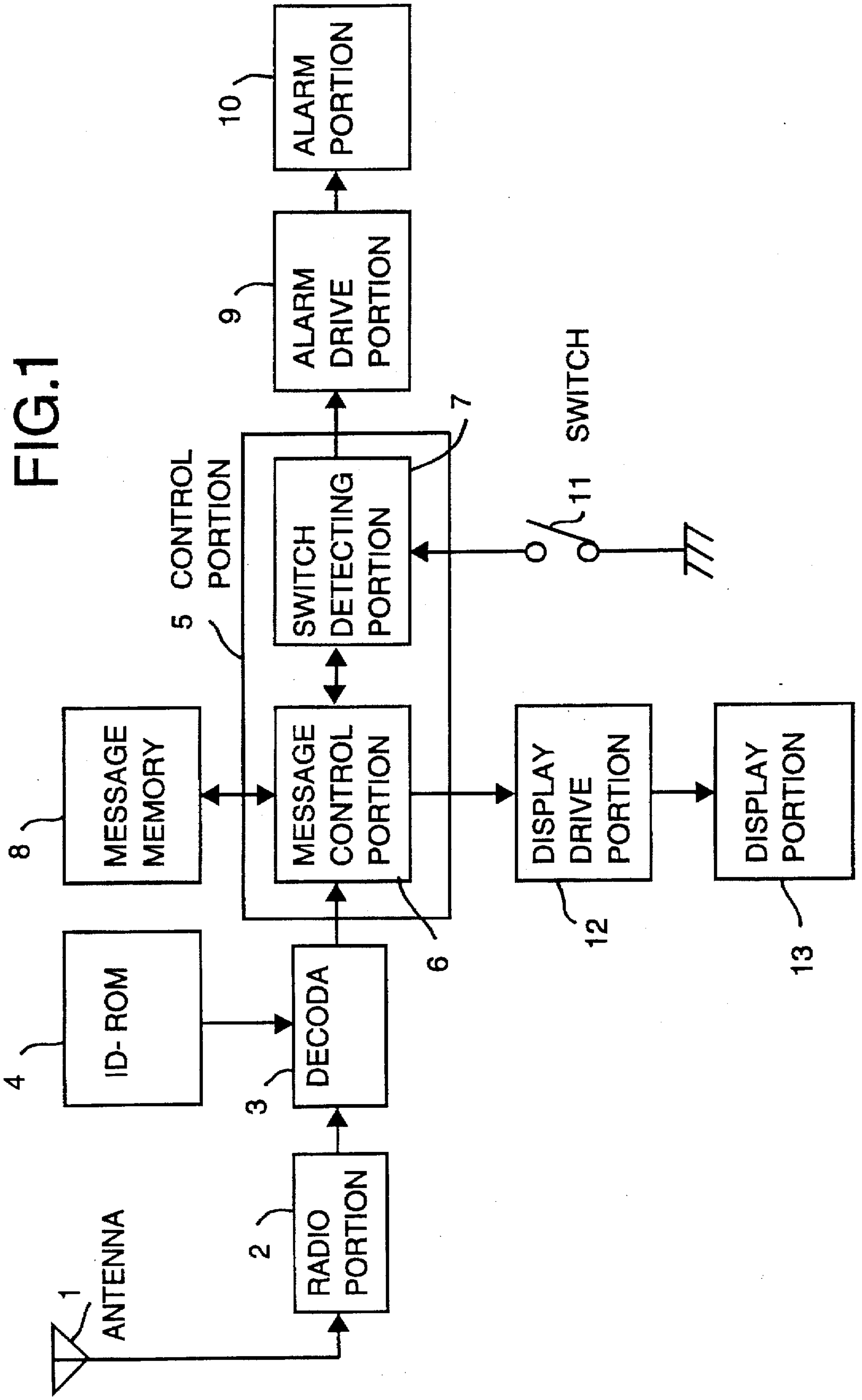
FIG. 1 is a block diagram of a selective calling radio receiver having non-read message alarm function, according to an embodiment of the present invention.

In FIG. 1 which shows an embodiment of the present invention, an antenna 1 receives a radio signal from a base station which is not shown and outputs the received signal to a radio portion 2. The radio portion 2 amplifies, demodulates and wave-shapes the received signal from the antenna 1 and outputs a demodulated signal. An ID-ROM 4 is constructed with a P-ROM and stores a predetermined ID number assigned to the receiver. A decoder 3 converts the demodulated signal from the radio portion 2 into a digital signal and detects a call signal contained in the demodulated digital signal. Further, the decoder 3 detects a coincidence between the call signal and the ID number stored in the ID-ROM 4 and outputs an ID coincidence signal as well as the demodulated digital signal when they are coincident. A message memory 8 is constituted with a RAM which stores messages contained in the demodulated digital signal separately as non-read message and read message. A control portion 5 includes a universal microprocessor and includes a message control portion 6 and a switch detecting portion 7.

The message control portion 6 searches messages stored in the message memory 8 when the ID coincidence signal is inputted from the decoder 3. That is, the search is to determines whether or not a non-read message is stored. Since the top bit of a non-read message is set to 1, the non-read message is detected by searching a code of the top bit stored in the message memory 8. The message control portion 6 outputs a non-read alarm generating signal when a non-read message is detected from the message memory 8 or a normal alarm generating signal when there is no non-read message. The non-read alarm generating signal is distinguished from the normal alarm generating signal by their identification signals each of 2 bits. The non-read alarm generating signal is represented by a digital signal "01" and the normal alarm generating signal is represented by a digital signal "10". When a switch detecting signal requesting a termination of call alarm of sound for notifying a bearer of the selective calling radio receiver that the receiver is being called is input from the switch detecting portion 7 to be described later, the message control portion 6 outputs an alarm termination signal and sends a message contained in the demodulated digital signal to a display drive portion 12. The alarm termination signal is represented by a 2-bit identification signal "11". The message control portion 6 outputs the message to the display drive portion 12 and outputs it to the message memory 8 by attaching 0 to the top bit of this message and stores it therein as a read message. On the other hand, when the switch detecting signal is not inputted in message control portion 6, the message control portion 6 does not output the alarm termination signal. However, when there is a time-up signal input from the switch detecting portion 7, the message control portion 6 outputs an alarm termination signal. In response to the alarm termination signal, the message control portion 6 attaches 1 to the top bit of the message contained in the demodulated digital signal and stores it in the message memory 8 as a non-read message.

The switch detecting portion 7 monitors an operation of the switch 11 and, when the switch 11 is operated, outputs the above-mentioned switch detection signal. On the other hand, the switch detecting portion 7 includes a timer housed therein and outputs the time-up signal when the switch 11 is not operated even after the timer measures a constant time lapses from the time when the control portion 5 is input with the ID coincidence signal.

The switch 11 is a push-button type switch and is pushed by the bearer when he becomes aware of him being called.

The display drive portion 12 drives the display portion 13 such that a message output from the message control portion 6 is displayed on the display portion 13.

The display portion 13 is constituted with a liquid crystal display which displays the message output from the message memory 8.

The alarm drive portion 9 responds to the non-read alarm generating signal or the normal alarm generating signal output from the message control portion 6 to output a non-read alarm drive signal or a normal alarm drive signal having a call pattern different from that of the non-read alarm drive signal.

The alarm portion 10 is constituted with a loudspeaker and, on the basis of the call pattern of the non-read alarm drive signal or the normal alarm drive signal output from the alarm drive portion 9, performs call alarms which are different depending on whether or not there is non-read message, that is non-read alarm or normal alarm.

The call patterns of the non-read alarm drive signal and the normal alarm drive signal output from the alarm drive portion 9 will be described with referent to waveforms shown in FIGS. 2A, 2B, 3A, 3B, 4A and 4B.

Figure 2A:
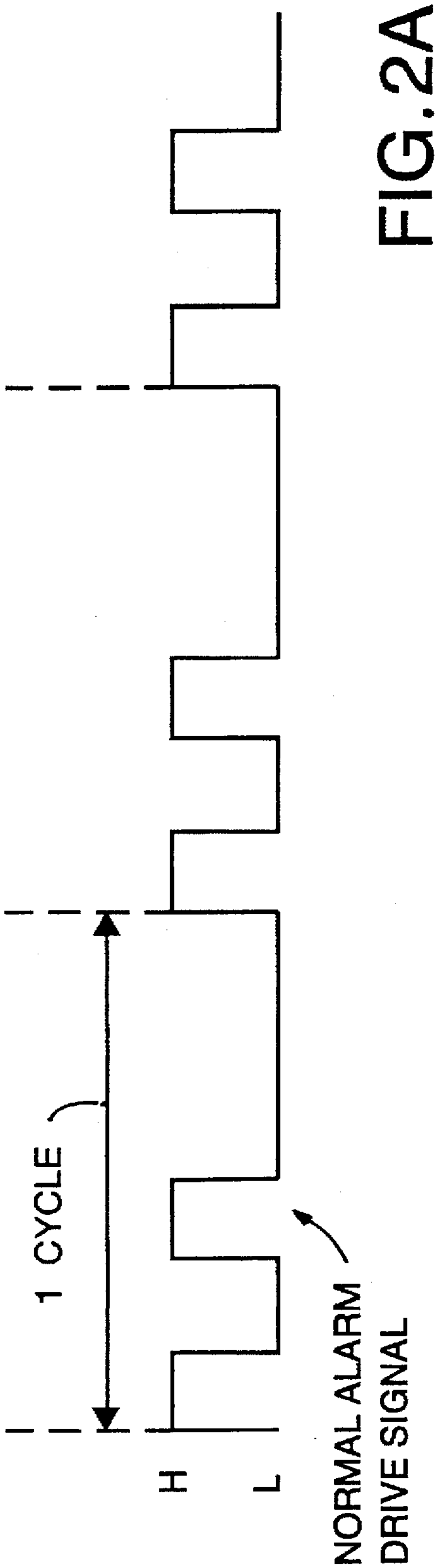
FIGS. 2A and 2B show waveforms of a non-read alarm drive signal and a normal alarm drive signal, for explaining a first call pattern of the receiver shown in FIG. 1.
Figure 2B:
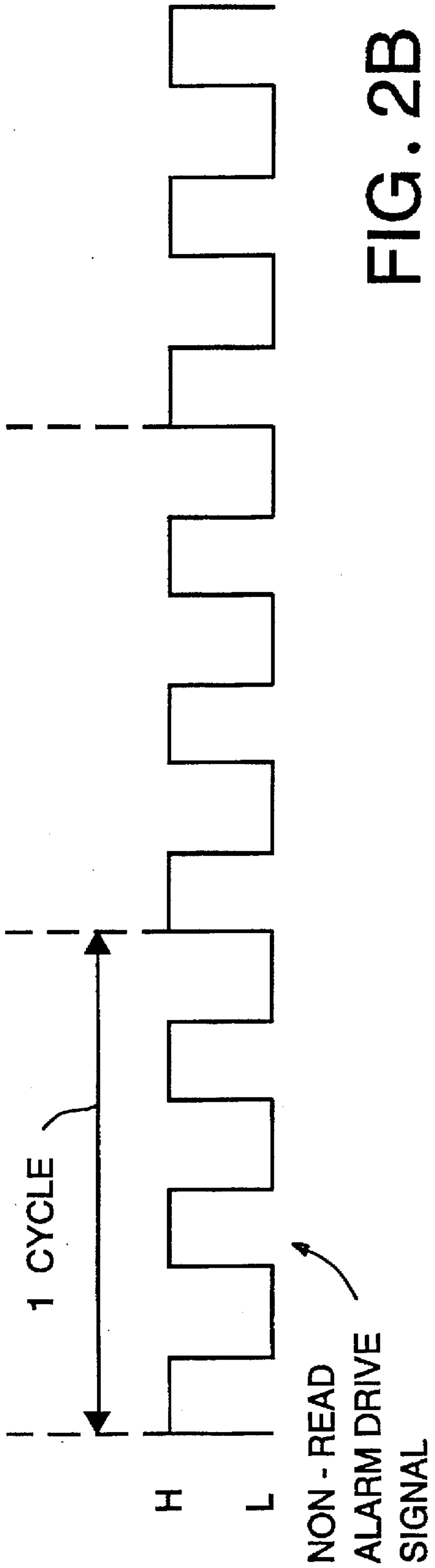

FIGS. 2A and 2B show waveforms for explaining a first call pattern of a non-read alarm drive signal and a normal alarm drive signal.

In these figures, the alarm drive portion 9 responds to a normal alarm generating signal "10" output from the message control portion 6 to output the normal alarm drive signal having the call pattern shown in FIG. 2A to the alarm portion 10. On the other hand, the alarm drive portion 9 responds to a non-read alarm generating signal "01" output from the message control portion 6 to output the normal alarm drive signal having the call pattern shown in FIG. 2B to the alarm portion 10. Comparing FIG. 2A with FIG. 2B, it is clear that the call patterns of 1 cycle period are different from each other although length of 1 cycle period is the same. The alarm drive portion 9 outputs the normal alarm drive signal and the non-read alarm drive signal which are shown in FIG. 2 to the alarm portion 10 to drive the latter. Since sounds produced by the alarm portion 10 are different correspondingly to the difference in the call patterns, the bearer can know an existence or absence of non-call message from the difference in sound alarm. That is, when the alarm drive portion 9 outputs the normal alarm drive signal shown in FIG. 2A, alarm sound generated by the alarm portion 10 becomes discontinuous sound, whereas, when the alarm drive portion 9 outputs the non-read alarm drive signal shown in FIG. 2B, alarm sound generated by the alarm portion 10 becomes continuous sound.

Figure 3A:
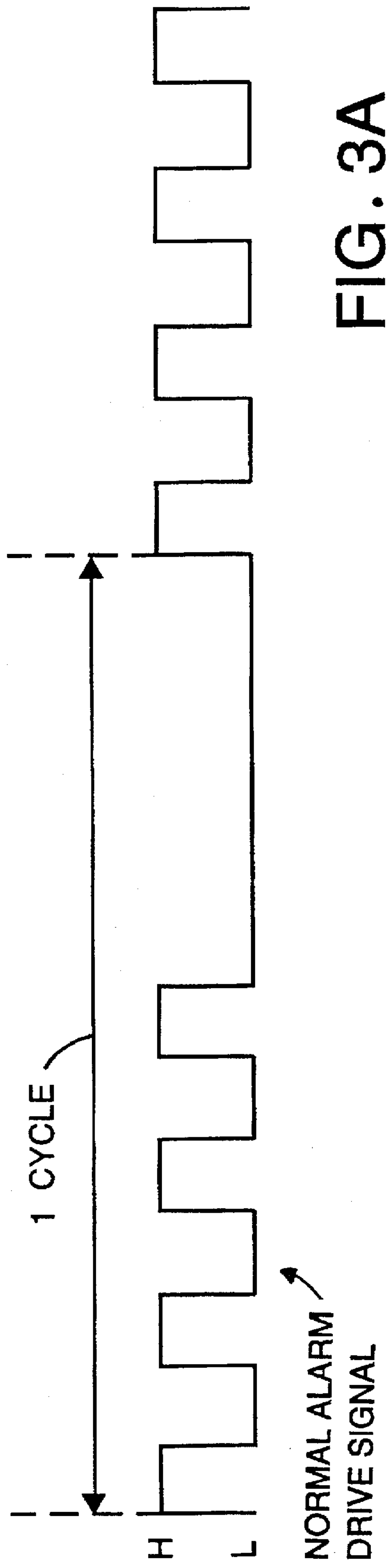
FIGS. 3A and 3B show waveforms of a non-read alarm drive signal and a normal alarm drive signal, for explaining a second call pattern of the receiver shown in FIG. 1.
Figure 3B:
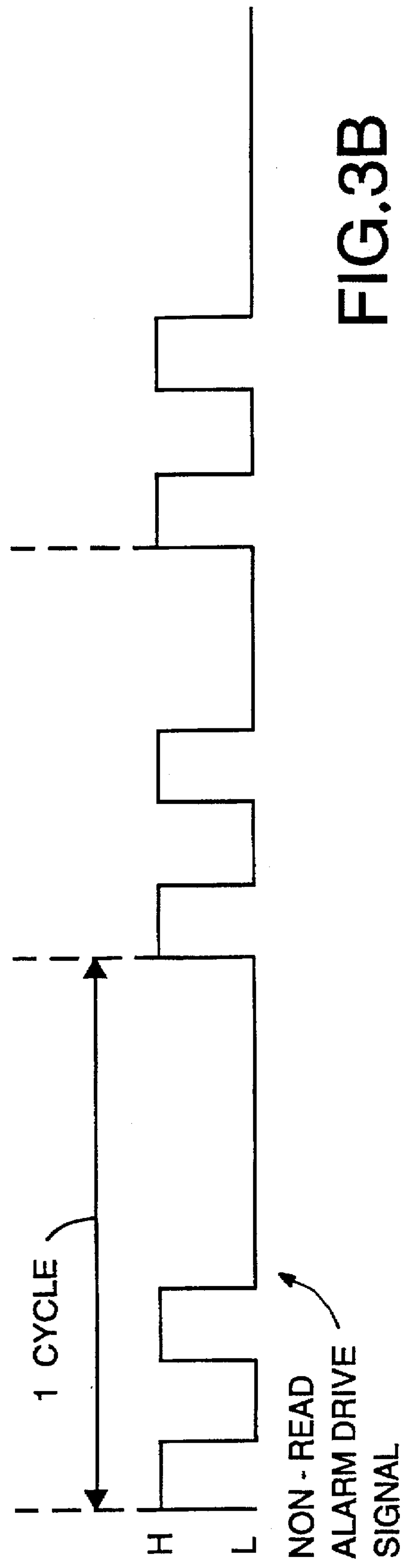

FIGS. 3A and 3B show waveforms for explaining a second call pattern of a non-read alarm drive signal and a normal alarm drive signal.

In these figures, the alarm drive portion 9 responds to a normal alarm generating signal "10" output from the message control portion 6 to output the normal alarm drive signal having the call pattern shown in FIG. 3A to the alarm portion 10. On the other hand, the alarm drive portion 9 responds to a non-read alarm generating signal "01" output from the message control portion 6 to output the normal alarm drive signal having the call pattern shown in FIG. 3B to the alarm portion 10. Comparing FIG. 3A with FIG. 3B, it is clear that the call patterns of 1 cycle period are different from each other and lengths of 1 cycle period thereof are also different. That is, when the alarm drive portion 9 outputs the normal alarm drive signal shown in FIG. 3A, alarm sound having a constant pattern is generated by the alarm portion 10 with a long time interval. On the other hand, when the alarm drive portion 9 outputs a non-read alarm drive signal shown in FIG. 3B, alarm sound having a constant pattern is generated by the alarm portion 10 with a short time interval.

Figure 4A:
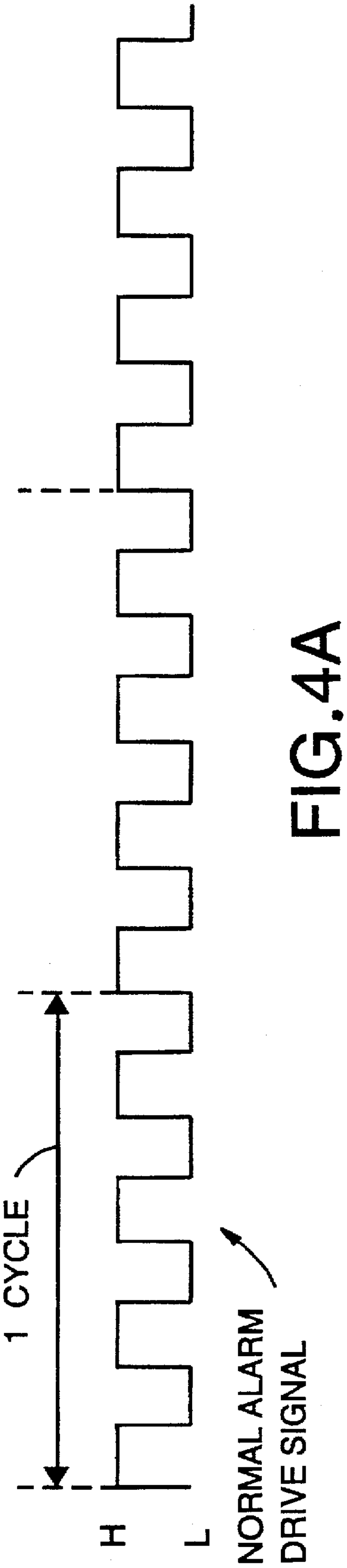
FIGS. 4A and 4B show waveforms of a non-read alarm drive signal and a normal alarm drive signal, for explaining a third call pattern of the receiver shown in FIG. 1.
Figure 4B:
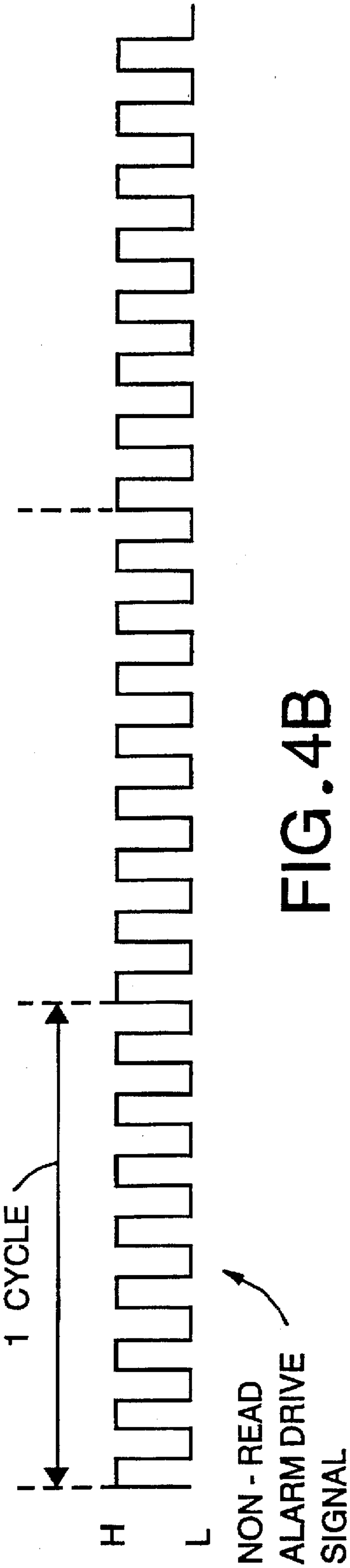

FIGS. 4A and 4B show waveforms for explaining a third call pattern of a non-read alarm drive signal and a normal alarm drive signal.

In these figures, the alarm drive portion 9 responds to a normal alarm generating signal "10" output from the message control portion 6 to output the normal alarm drive signal having the call pattern shown in FIG. 4A to the alarm portion 10. On the other hand, the alarm drive portion 9 responds to a non-read alarm generating signal "01" output from the message control portion 6 to output the normal alarm drive signal having the call pattern shown in FIG. 4B to the alarm portion 10. Comparing FIG. 4A with FIG. 4B, it is clear that the call patterns of 1 cycle period are different in frequency from each other although lengths of 1 cycle period thereof are also different. That is, when the alarm drive portion 9 outputs the normal alarm drive signal shown in FIG. 4A, alarm sound is generated by the alarm portion 10 as having a relatively slow rhythm. On the other hand, when the alarm drive portion 9 outputs a non-read alarm drive signal shown in FIG. 4B, alarm sound is generated by the alarm portion 10 as a relatively high speed rhythm.

Although, in this embodiment, the alarm has been described as sound generated by the alarm portion 10 constituted with the loudspeaker, as an example, it is of course possible to constitute the alarm portion 10 with other component such as vibrator or LED.

In case where the alarm portion of the selective calling radio receiver is constituted with a vibrator, different call patterns of the non-read alarm drive signal and the normal alarm drive signal are output from the alarm drive portion 9 as difference in vibration generated by the alarm portion 10.

Similarly, when the alarm portion of the selective calling radio receiver is constituted with an LED, different call pattersn of the non-read alarm drive signal and the normal alarm drive signal are output from the alarm drive portion 9 as difference in flushing of light emitted by the alarm portion 10.

Figure 5:
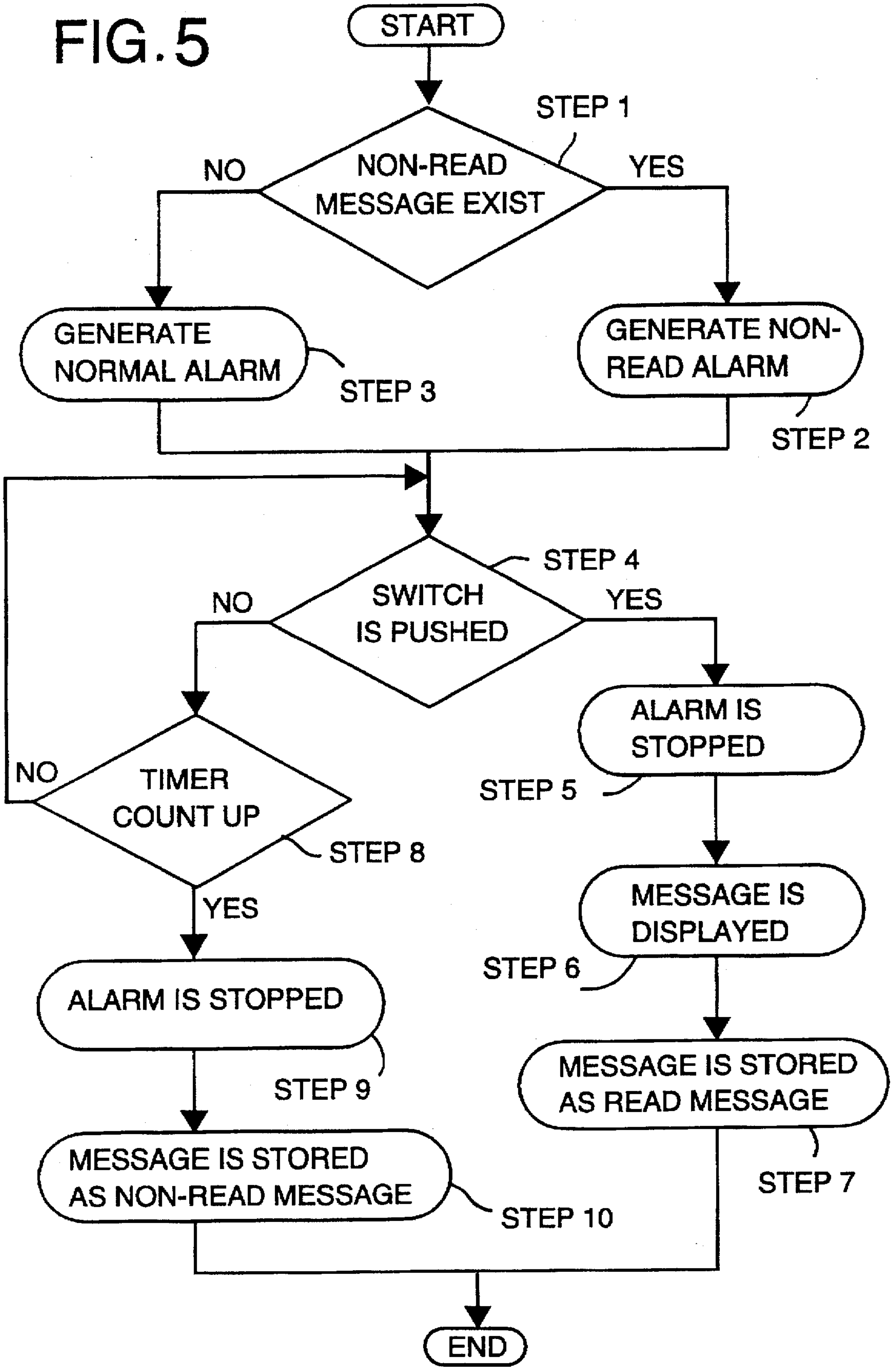
FIG. 5 is a flowchart showing an operation of the receiver, shown in FIG. 1.

Now, an operation of the selective calling radio receiver having an alarm function of alarming non-read message, shown in FIG. 1 will be described with reference to FIG. 5. Since an operation of the receiver from the reception at the antenna 1 of the radio signal from the base station to the generation of the ID coincidence signal from the decoder 3 is the same as that described with reference to FIG. 1, it is omitted here.

When the control portion 5 is supplied with the ID coincidence signal and the demodulated digital signal (START), the control portion 5 performs a search as to whether or not there is a non-read message in the message memory 8 (STEP 1). When the control portion 5 detects an existence of non-read message in the message memory 8, it controls the alarm portion 10 to perform a non-read message alarming (STEP 2). Under the non-read alarm control of the control portion 5, the alarm drive portion 9 drives the alarm portion 10 to alarm a non-read message. On the other hand, if the control portion 5 does not detect any non-read message from the message memory 8 in the STEP 1, the alarm portion 10 performs a normal alarming (STEP 3). Under the normal alarm control of the control portion 5, the alarm drive portion 9 drives the alarm portion 10 to perform a normal alarm. The control portion 5, after it controls the alarming operation of the alarm portion 10, monitors whether or not the switch 11 is pushed by the bearer (STEP 4). If the bearer becomes aware of the call and operates the switch 11, the control portion 5 outputs an alarm termination signal (STEP 5). With this alarm termination signal, the alarm drive portion 9 drives the alarm portion 10 to terminate its alarming operation. When the control portion 5 outputs the alarm termination signal, the message contained in the demodulated digital signal is supplied to the display drive portion 12. The display drive portion 12 displays the message supplied from the control portion 5 on the display portion 13 (STEP 6). Simultaneously with the message supply from the control portion 5 to the display drive portion 12, the control portion 5 stores the message in the message memory 8 as a read message (STEP 7) and the operation is terminated (END). On the other hand, if the bearer does not become aware of the call and does not operate the switch 11 in the STEP 4, it is determined whether or not the timer in the control portion 5 messages a predetermined constant time from the call (STEP 8) and, if the timer measures the constant time, the control portion 5 outputs the alarm termination signal (STEP 9). Upon the alarm termination signal from the control portion 5, the alarm drive portion 9 drives the alarm portion 10 to terminate its alarming operation. When the control portion 5 outputs the alarm termination signal, the message contained in the demodulated digital signal is stored in the message memory 8 as a non-read message (STEP 10) and the operation is terminated (END).

The operation of the control portion 5 will be described in more detail with reference to FIGS. 6 and 7 which show operations of the message control portion 6 and the switch detecting portion 7 which constitute the control portion 5, respectively.

Figure 6:
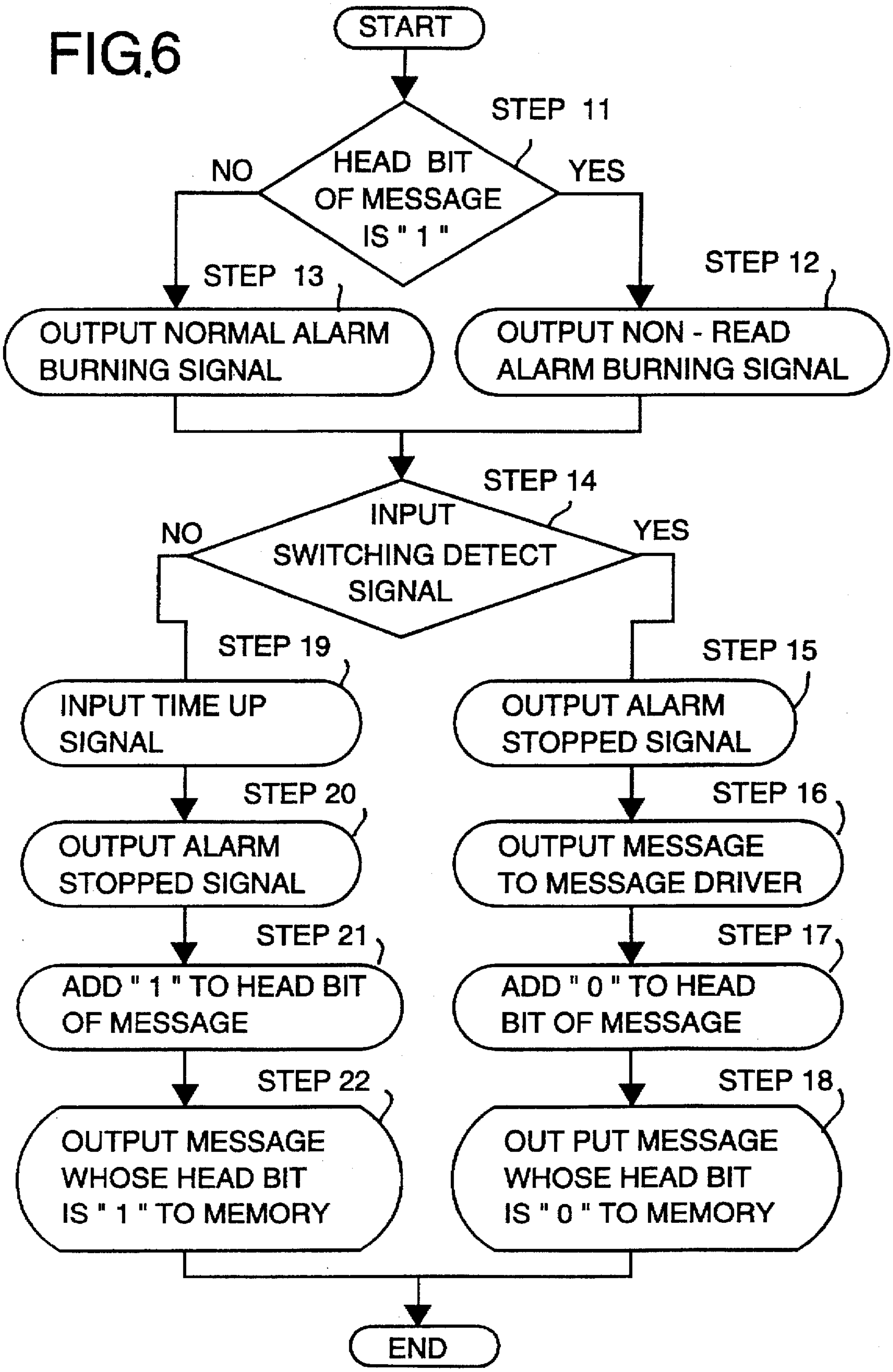
FIG. 6 is a flowchart showing an operation of a message control portion of the receiver, shown in FIG. 1.

FIG. 6 is a flowchart showing the operation of the message control portion 6.

First, the ID coincidence signal from the decoder 3 is supplied to the message control portion 6 (START). Upon the ID coincidence signal from the decoder 3, the message control portion 6 searches the message memory 8 as to whether or not any non-read message is stored therein, by detecting any message having a head bit of 1 (STEP 11). When the message control portion 6 detects a message having a head bit of 1 in the message memory 8, the message control portion 6 outputs a non-read alarm generating signal which is a digital, 2-bit identification signal "01"(STEP 12). When the message control portion 6 does not detect any message having a head bit of 1 in the message memory 8, the message control portion 6 outputs a normal alarm generating signal which is a digital, 2-bit identification signal "10" (STEP 13). After the message control portion 6 outputs the non-read alarm generating signal or the normal alarm generating signal, it waits for a switch detecting signal (STEP 14). When the message control portion 6 receives the switch detecting signal, it outputs an alarm termination signal which is a digital, 2-bit identification signal "11" (STEP 15). Simultaneously with the supply of the alarm termination signal, the message control portion 6 supplies message contained in the demodulated digital signal to the display drive portion 12 (STEP 16). When the message control portion 6 outputs the message to the display drive portion 12, it attaches 0 to the head address of a message equivalent to the message output to the display drive portion 12 to make it as a read message (STEP 17), outputs the read message to the message memory 8 (STEP 18) and terminates the operation (END). On the other hand, if, in the STEP 14, the message control portion 6 receives not the switch detecting signal but a time-up signal (STEP 19), it outputs an alarm termination signal which is a digital, 2-bit identification signal "11" (STEP 20). Further, with the supply of the alarm termination signal, the message control portion 6 attaches 1 to the head address of the message contained in the demodulated digital signal to make it as a non-read message (STEP 21), outputs the non-read message to the message memory 8 (STEP 22) and terminates the operation (END).

Figure 7:
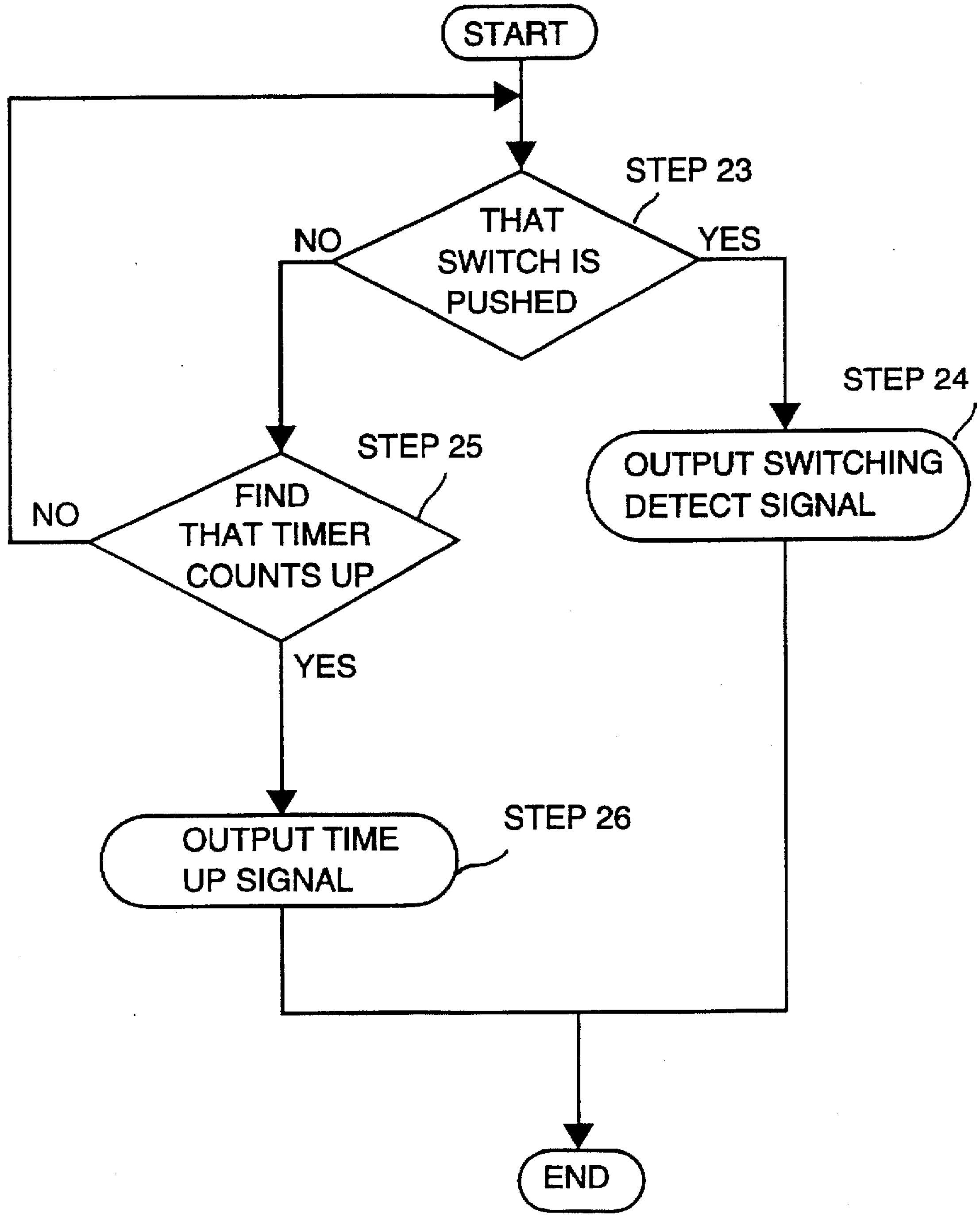
FIG. 7 is a flowchart showing an operation of a switch detecting portion of the receiver, shown in FIG. 1.

FIG. 7 is a flowchart showing the operation of the switch detecting portion 7. First, when the switch detecting portion 7 receives a non-read alarm generating signal or a normal alarm generating signal from the message memory control portion 6, a timer provided in the switch detecting portion 7 is started (START). From the start of the timer, the switch detecting portion 7 monitors as to whether the switch 11 is pushed (STEP 23). When the switch 11 is pushed, the switch detecting portion 7 sends a switch detection signal to the message control portion 6 (STEP 24) and terminates its operation (END). On the other hand, when, in the STEP 23, a predetermined constant time lapses without pushing of the switch 11 and the timer of the switch detecting portion 7 counts up (STEP 25), the switch detecting portion 7 sends a time-up signal to the message memory control portion 6 (STEP 26) and the operation is terminated (END).

As described, the selective calling radio receiver with non-read message alarming function, according to the present invention, detects a non-read message by utilizing the call alarm for calling the receiver itself and alarms the call alarm in a different manner according to existence or absence of the non-read message. Therefore, it is possible to avoid the troublesome procedures for confirming an existence of non-read message by operating a switch, etc., which are necessary in the conventional receiver. Further, since it is possible to automatically know a presence or absence of non-read message every call alarm, it is possible to substantially reduce the possibility of undesired erase of non-read message due to a limitation of capacity of a memory for storing non-read message and to confirm non-read message reliably.

Further, the selective calling radio receiver according to the present invention utilizes a timer provided within a microprocessor to measure a time within which the switch is to be pushed. Therefore, it is not necessary to provide any timer separately, making a construction of an internal circuit of the receiver simpler. Further, since it is unnecessary to alarm an existence of non-read message by sound generated at a constant time interval, the possibility of disturbance of a meeting is substantially reduced even if a bearer of the receiver attends thereto.

What is claimed is:

1. A selective calling radio receiver having an alarm function for a non-read message, comprising:

an antenna for receiving a radio signal and outputting a received signal;

a radio portion for demodulating said received signal and outputting a demodulated signal;

an identification memory for storing an identification number assigned to said selective calling radio receiver;

a decoder for decoding said demodulated signals to produce a decoded signal and for detecting a coincidence of a call signal contained in said demodulated signal and said identification number to produce an identification coincidence signal;

a message memory for storing messages contained in the decoded signal separately as non-read messages and read messages;

a control portion including non-read message detecting means and message producing means, said non-read message detecting means detecting said non-read message in response to said coincidence signal and generating a non-read alarm generating signal or a normal alarm generating signal, said message producing means producing a message contained in said demodulated signal;

display means for displaying the message under control of said message producing means; and alarm means for producing a non-read alarm or a normal alarm under control of said non-read alarm generating signal or said normal alarm generating signal.

2. The selective calling radio receiver claimed in claim 1, further comprises a switch for terminating a call alarm and wherein, when said switch is not operated after a predetermined period of time elapses, said control portion controls said selective calling radio receiver to terminate the call alarm and then generates said non-read message by attaching 1 to a head bit of said message.

3. The selective calling radio receiver claimed in claim 1, wherein, when said switch is operated, said control portion controls said selective calling radio receiver to terminate said call alarm and then to generate the read message by attaching 0 to a head bit of said message.

4. The selective calling radio receiver claimed in claim 1, wherein said control portion controls said selective calling radio receiver to detect said non-read message by searching the head bit of said message stored in said message memory.

5. The selective calling radio receiver claimed in claim 1, wherein said control portion controls said alarm means to perform said non-read alarm by sending a 2-bit digital identification signal "01" to said alarm means and to perform said normal alarm by sending a 2-bit digital identification signal "10" to said alarm means.

6. The selective calling radio receiver claimed in claim 1, wherein said control portion controls said alarm means to terminate said call alarm by sending a 2-bit digital identification signal "11" to said alarm means.

7. The selective calling radio receiver claimed in claim 1, wherein said alarm means comprises a loudspeaker.

8. The selective calling radio receiver claimed in claim 1, wherein said alarm means comprises a vibrator.

9. The selective calling radio receiver claimed in claim 1, wherein said alarm means comprises an LED.

10. The selective calling radio receiver claimed in claim 7, wherein said non-read alarm and said normal alarm are performed by said call alarm using sounds having different frequencies, patterns or cycle periods, respectively.

11. The selective calling radio receiver claimed in claim 8, wherein said non-read alarm and said normal alarm are performed by said call alarm using vibrations having different frequencies, patterns or cycle periods, respectively.

12. The selective calling radio receiver claimed in claim 9, wherein said non-read alarm and said normal alarm are performed by said call alarm using flushing light having different flushing frequencies, patterns or cycle periods, respectively.

13. A message processing method of a selective calling radio receiver having a non-read message alarm function, comprising steps of:

generating an identification coincidence signal indicative of coincidence of a call signal contained in a radio signal from a base station and an identification number assigned to the selective calling radio receiver;

detecting a non-read message not displayed on a display portion from a message memory in response to said identification coincidence signal;

generating a non-read alarm generating signal when said non-read message is detected;

generating a normal alarm generating signal when said non-read message is not detected;

generating a read message by attaching 0 to a head bit of a message; and generating said non-read message by attaching 1 to the head bit of said message.

14. The message processing method of a selective calling radio receiver having a non-read message alarming function, claimed in claim 13, wherein, said step of detecting a non-read message comprises a step of searching the top bit of said message stored in said message memory portion.

15. The message processing method of a selective calling radio receiver having a non-read message alarming function, claimed in claim 13, wherein, said step of generating a non-read alarm generating signal comprises a step of generating a 2-bit digital identification signal "01" as said non-read alarm generating signal.

16. The message processing method of a selective calling radio receiver having a non-read message alarming function, claimed in claim 13, wherein, said step of generating a normal alarm generating signal comprises a step of generating a 2-bit digital identification signal "10" as the normal alarm generating signal.

* * * * *